United States Patent [19]
Justak et al.

[11] Patent Number: 5,348,401
[45] Date of Patent: Sep. 20, 1994

[54] HYBRID BEARINGS FOR TURBOPUMPS

[75] Inventors: John F. Justak, Stuart, Fla.; Gregg R. Owens, South Windsor, Conn.

[73] Assignee: The United States of America as represented by the Administrator of the National Aeronautics and Space Administration, Washington, D.C.

[21] Appl. No.: 10,030

[22] Filed: Jan. 27, 1993

[51] Int. Cl.$^5$ ............................................. F16C 21/00
[52] U.S. Cl. ..................................................... 384/101
[58] Field of Search ............... 384/100, 101, 102, 114, 384/118, 119, 126

[56] References Cited
U.S. PATENT DOCUMENTS

| | | | |
|---|---|---|---|
| 3,026,154 | 3/1962 | Marchand | 384/126 |
| 3,332,726 | 7/1967 | Cooper | 384/101 |
| 3,642,331 | 2/1972 | Silver | 384/102 |
| 3,708,215 | 1/1973 | Wilcock et al. | 384/102 |
| 3,854,781 | 12/1974 | Bildtsen | 384/102 |
| 4,542,994 | 9/1985 | Mohsin | 384/101 |
| 4,927,274 | 5/1990 | Smith | 384/102 X |

Primary Examiner—Thomas R. Hannon
Attorney, Agent, or Firm—Robert L. Broad, Jr.; Guy Miller; Alan Kennedy

[57] ABSTRACT

In rocket engines power is usually obtained by burning fuel and oxidizer. The two are mixed, pressurized, and directed to a combustion chamber by means of turbopumps. Hydrostatic bearings have been proposed for use in these turbopumps because during flight, hydrostatic lubrication can reduce roller bearing wear. But during startup, acceleration and shutdown high pressure fluids are not available to provide fluid lubrication for hydrostatic bearings. During these periods a second bearing is required to carry the load, rendering hybrid bearings desirable for rocket engine turbopumps. Herein a hybrid hydrostatic-rolling element bearing has been provided. The rolling element bearing is locked on a stationary housing through which a rotating journal passes. A transient supporting ring is keyed to the journal. It is adapted to lock on the rolling element bearing so that the rolling element bearing supports radial loads during startup, initial acceleration, deceleration and shut down, and to release at high speeds.

5 Claims, 1 Drawing Sheet

HYBRID BEARINGS FOR TURBOPUMPS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention, broadly, relates to bearings. More particularly the invention pertains to hybrid bearings. In a still more specific aspect the invention relates to bearings for rocket engine turbopumps.

In rocket engines power is usually obtained by burning fuel and oxidizer which are mixed and directed to a combustion chamber. In these fuel feed systems turbopumps pressurize the propellants which are injected into the combustion chamber. The turbine must provide adequate shaft power for driving these propellant pumps. The turbopumps, then, are driven by the hot combustion products, generally combustion products of hydrogen and oxygen.

Roller bearings are generally used in turbopumps of rocket engines. However, because of bearing demands hydrostatic bearings have been proposed. The use of such bearings is quite feasible because during flight hydrostatic lubrication can reduce roller bearing wear. A disadvantage of such proposals is that during startup, acceleration and shutdown high pressure fluids are not available for hydrostatic bearings. Thus, unlike uses of normal hydrostatic bearings, the fluid lubrication film is not always present in bearings of turbopumps. During periods when the rotational speed of the Journal is too low, or when fluid pressure falls below the critical value for the hydrostatic bearing, the fluid film is ruptured and metal to metal contact increases friction and wear. A second bearing is, then, required to carry the load during such startup and shutdown periods. This requirement suggests the use of hybrid bearings in rocket engine turbopumps.

A characteristic of turbopumps is that they are high speed machines. They operate at shaft speeds as high as 93,000 rpm. Such high speed machines should utilize fluids as bearings to mitigate wear and tear. This criterion also suggests the use hybrid bearings.

A hybrid bearing for turbopumps is described in NASA Final Report CR-168124, RI/RD83-104 entitled Hybrid Hydrostatic/Ball Bearings in High-Speed Turbomachinery, January, 1983. In this report it is emphasized that vehicle requirements for future space maneuvering missions indicate the need for development of small, high-pressure liquid hydrogen turbopumps. These missions require high-speed operation for a long life, with many starts in a unit of minimum weight and envelope. Past efforts have included fluid dynamic and mechanical analysis, as well as design considerations to produce a liquid hydrogen turbopump for a 20,000 pound-thrust staged-staged combustion cycle engine for orbital transfer vehicle applications. The objective of the program reported in the Final Report was to retrofit a Mark 48 fuel turbopump with hybrid hydrostatic-ball bearings. This hybrid bearing is shown in FIG. 1. Referring to that figure, motor shaft 4 and, in this instance, duplex ball bearings 6 and 8, including balls 9 and 11, in inner races 10 and 12 and outer races 14 and 16 can be seen. The inner races, 10 and 12, are locked on shaft 4. The outer races, 14 and 16, in turn are locked in a ring or rotating annular sleeve or collar 18. This unit is contained within bearing housing, or shell, 20 adapted to provide a flow path 22 for the hydrostatic fluid, usually a portion of the turbopump outlet liquid oxygen. This liquid enters through channels or conduits 23 in housing 20, and flows both ways in flow path 22 between collar 18 and housing 20. This lifts both the bearing housing and the shaft or journal of the turbopump to the position shown in FIG. 1, thus supporting the journal when the pressure and quantity of flow are in correct proportions.

As shown in FIG. 1 rotating collar 18 terminates in a thrust-ring 24 which cooperates with an opposite thrust plate 26. Thrust plate 26 is carried by bearing housing 20 so that if pump thrust drives thrust ring collar 18 in that direction it will impinge on thrust plate 26 as a stop means.

Having described the hybrid bearing illustrated in FIG. 1, it is to be observed that even in the hydrostatic state duplex roller bearings 6 and 8 rotate with Journal 4. A disadvantage of that hybrid bearing is that at some increased speed, collar 18 will not be able to rotate as fast as journal 4. This is particularly true because the hydrostatic bearing pressure and flow supplied by the turbopump increase as pump speed increases. In addition the increasing pump speed creates hydrostatic bearing stiffness causing collar 18 to lag behind Journal 4. The result of this speed difference is that the roller bearing continues to wear. Another disadvantage is that duplex bearings do not wear evenly. These disadvantages are obviated herein by the provision of a hybrid hydrostatic-rolling element bearing wherein the rolling element bearing is locked to the stationary housing rather than on the rotating journal.

SUMMARY OF THE INVENTION

A hybrid bearing is provided herein having a rolling element bearing engaged during startup and shutdown, and a hydrostatic bearing engaged during operating speeds. The hybrid bearing includes a stationary bearing housing having the rotating journal-passing therethrough, and a rolling element bearing having circular inner and outer races surrounding a portion of the stationary bearing housing and the Journal therewithin, and with the inner race adjacent the housing. Means provide an interference fit of the inner race on the stationary housing therewithin with the outer race rotating freely. A transient support ring is so disposed that the Journal passes through its center, and means are provided keying the ring center to the journal so that the ring outer periphery rotates therewith. Latch means are included, adapted to lock the outer periphery of the transient support ring to the rolling element bearing outer race so that the rolling element bearing supports radial loads during the startup, initial acceleration, deceleration and shut down, and to unlock and disengage at operating speeds. Also included is a hydrostatic bearing in the form of a fluid lubricated bearing adapted to carry the radial loads at said operating speeds during the disengagement of the latch means and the rolling element bearing.

DETAILED DESCRIPTION OF THE INVENTION

It will be seen that the inner race of the roller bearing normally is seated on the transient Journal, one example being illustrated in FIG. 1. A feature of the invention herein is that the inner race is press fit or seated on a portion, an extension, of the stationary bearing housing surrounding the journal. This will be readily apparent from a description of the invention in conjunction with the drawings.

SPECIFIC EMBODIMENTS OF THE INVENTION

Figure 2:
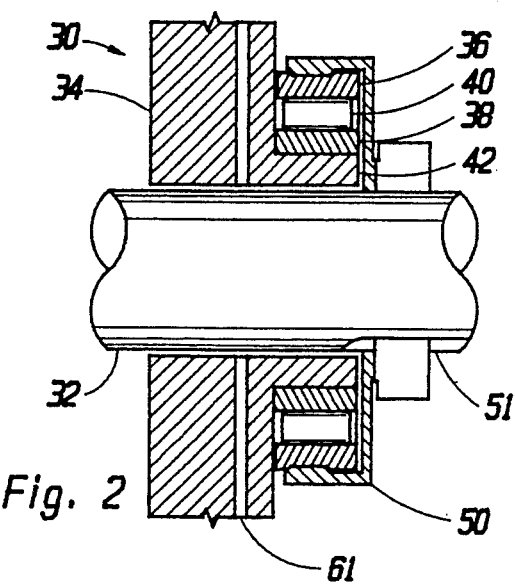
FIG. 2 is a view, partially in section, of the hybrid bearing of the invention in the roller bearing mode.

One form of the hybrid hydrostatic-rolling element bearing of the invention is illustrated in FIG. 2, the term "rolling element" being used to mean roller bearings having either balls (41, 6) or rollers (40, FIG. 3) in their races. The hybrid bearing 30 shown in FIG. 2 is in the roller bearing mode. In other words the rolling element or roller bearing is supporting radial loads. As in commercial motors, generators, and similar devices a Journal or shaft 32 passes through a bearing housing 34 carrying roller bearings.

Figure 6:
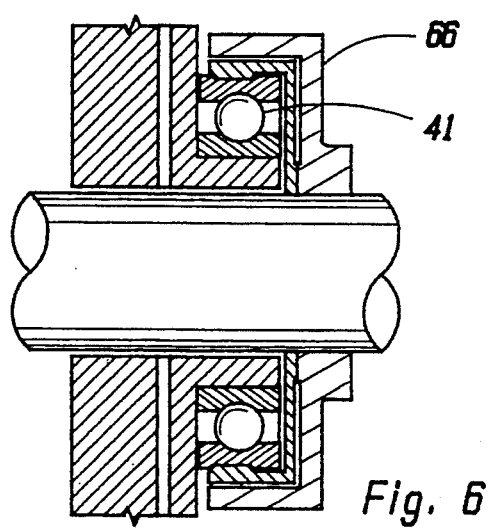
FIG. 6 is a view identical to FIG. 3 except that ball bearings are depicted.

Conventionally the outer race of the roller bearing has been seated in the bearing housing. This is not the case herein. Outer roller bearing ring or race 36 and inner ring race 38 are shown in FIG. 2 with preferred roller bearings 40 or ball bearings 41, FIG. 6 therebetween. However normally the inner race is seated on or locked on the Journal. It is to be noted that herein the inner race 38 is seated, not on the Journal, but on the housing. A portion of housing 34 is adapted to receive the inner bearing race. Bearing housing 34 is provided with an extension or shoulder 42, and the inner ring bearing race 38 is press fit thereon.

Figure 4:
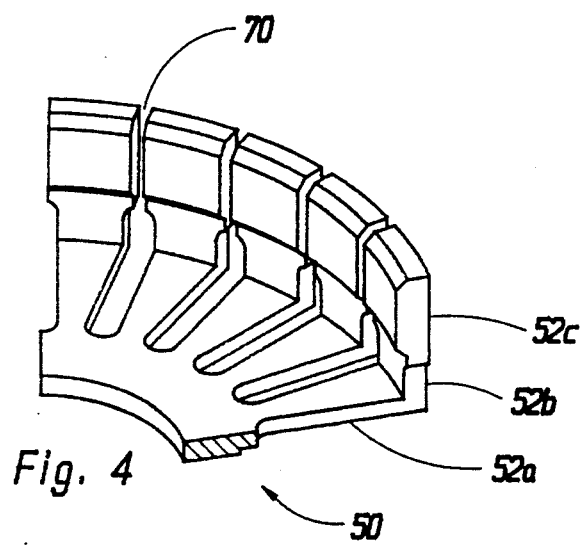
FIG. 4 is a partial isometric view of the transient support ring 50 shown in FIGS. 2, 3, and 5.

An important aspect of this invention is that with this structure having the roller bearing inner race keyed to the bearing housing rather than the Journal, means must be provided linking the outer roller bearing race to the Journal. This means must support the outer ring ball race so that the roller bearing will carry the load. This is accomplished by a transient support ring 50. It is to be noted that at 51 (FIG. 2) this support ring 50 is keyed to Journal 32. Linking the transient support ring to the outer ball bearing race 36 are fingers 52a and 52b attached to, or formed in, transient support ring 50 at its outer periphery as shown in FIG. 4. Means must also be provided latching or locking the fingers on the outer roller bearing race. To this end the fingers are bent upwardly so that at 52b they are virtually perpendicular to finger portions 52a. A widened or thickened outer edge 52c then snaps into an annular circumferential groove in the outer roller bearing race 36 (FIG. 2). In actual fact the annular groove is part of a channel 60 extending from x to y in FIG. 5. Channel 60, as the flow path between the journal and the bearing, is the fluid retainer for the supporting fluid film which provides the gas lubricating the bearing, the hydrostatic lift, in the hydrostatic mode shown FIG. 5.

Considering now the operation of the device, since the outer race is keyed to a rotating part and the roller bearing rotates during startup, initial acceleration, deceleration and shutdown and the rolling element bearing supports the Journal or shaft load until centrifugal forces cause an outward growth of the transient support ring, eliminating loading of the rolling element bearing as the fingers 52c are thrown off of the outer roller bearing race. By this time sufficient pump pressure is supplied through inlet 61 to channel 60 of the hydrostatic bearing to provide lift-off. At lift-off gases entering inlets such as feed holes 61 flow in both directions through channel 60, that is toward both point x and point y as shown by the arrows in FIG. 5. As a consequence the hydrostatic bearing radially supports the spinning shaft.

PREFERRED EMBODIMENT

Desirably, in the hybrid bearing of this invention it is preferred to restrict the centrifugal outward growth of fingers 52b and 52c. To this end a support retainer 66 (FIGS. 3 and 5) is incorporated in the preferred form of hybrid bearing. This support retainer 66 is keyed to Journal 32 adjacent transient support ring 50, and remains adjacent thereto with a space a therebetween. As support retainer 66 extends, first along the transient support ring 50, and then adjacent fingers 52a, 52b, and 52c, it includes a right angle bend b. Clearly the support retainer rotates with the support ring since both are attached to the shaft.

Figure 3:
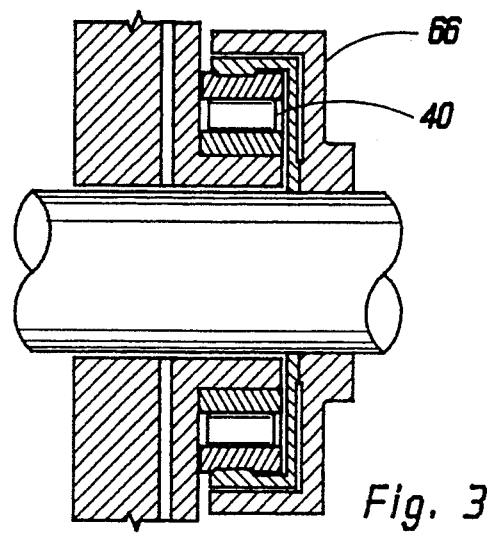
FIG. 3 is a similar view of another embodiment of the hybrid bearing of FIG. 2 also in the roller bearing mode.
Figure 5:
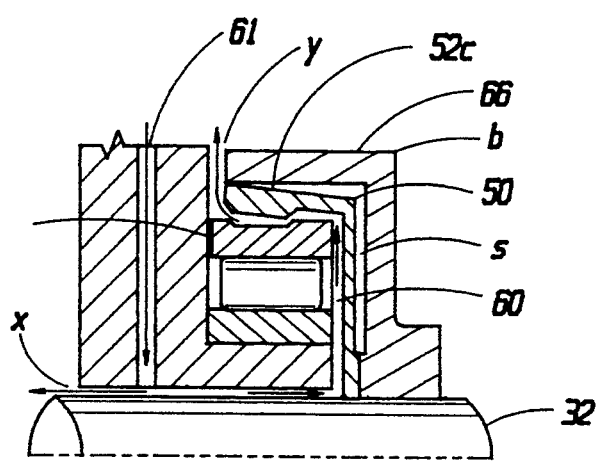
FIG. 5 is a partial sectional view of the embodiment of FIG. 3 in the hydrostatic bearing mode.

Comparing FIG. 3 with FIG. 5 it can be seen that in the roller bearing mode of FIG. 3 space s is uniform to the ends of fingers 52c. When the fingers are centrifugally released from outer race 36, space s narrows as shown in FIG. 5. As the shaft speed further increases it is desirable to restrain the centrifugal outward growth of fingers 52b and 52c. Support retainer 66 restricts this outward growth without metal to metal friction since it rotates with the fingers.

Another advantage of the inclusion of transient support retainer 66 is that during excessive excursions of the shaft assembly it transmits a fractional load to the roller bearing. Occasionally, due to high rpm and other variables, instabilities develop which can result in rather intense vibrations. If vibration displacement is great enough support retainer 66 will force fingers 52c into their groove in the outer race or the rolling element bearing so that the roller bearing cooperates with the hydrostatic bearing to suppress the instability, and inhibit metal-to-metal friction which in an oxygen atmosphere is extremely detrimental.

Figure 1:
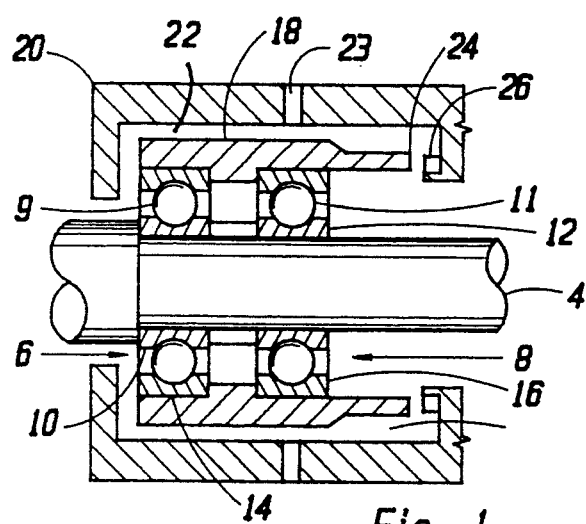
FIG. 1 is a diagrammatic view of a prior art hybrid bearing suited, among other uses, for a rocket engine turbopump.

It can be seen that this invention utilizes a rolling element bearing with its outer race keyed to the transient support, and rotating with that support and the shaft. An advantage of the invention is that the roller bearing is not subject to inertial rotational wear in the hydrostatic mode. In addition the disadvantages of duplex bearings, required to support the sleeve in FIG. 1, are overcome.

It is appreciated that this hybrid bearing is design specific. However the parameters are within the skill of the art. Thus, from shaft speeds accelerating up to 87,000 rpm and the mass of the fingers forces can be determined. From these and other parameters such as sizes and clearances the resiliency of fingers 52b can be derived.

Having been given the teachings of this invention other modifications and ramifications will occur to those skilled in the art. As an example, if the hydrostatic bearing's lift off speed is too low to allow sufficient centrifugal growth, given the bearing's load carrying capacity, weights can be added to latch finger tips 52c. It will be understood also that uses other than rocket engine turbopumps come into consideration for the hybrid bearings of the invention. Further, various fluids other than fluids discharged from the pump itself can be used such as oils, water, steam, and the like. As another modification it is to be appreciated that there are instances when it is desirable that outer bearing race rotate in the hydrostatic mode. One reason is that frictional engagement in the oxygen atmosphere is possible when finger tips 52c re-engage the outer bearing race 36. This can be accomplished by the provision of pins in outer bearing race 36 which by extending through slots 70 between finger portions 52a. In still another modification the size of the rolling element bearing, and the lengths of the fingers can be factored into end uses. These and other variations are deemed to be within the scope of this invention.

What is claimed is:

1. A hybrid bearing having a rolling element bearing engaged during startup and shutdown, and a hydrostatic bearing engaged during operating speeds, the hybrid bearing comprising a stationary bearing housing having a housing portion adapted to receive a circular bearing race, the stationary bearing housing also having a rotating journal passing therethrough, a rolling element bearing having circular inner and outer races, means for seating the inner race of said bearing on the stationary bearing housing portion so that the outer race rotates freely, a transient support ring so disposed that the journal passes through its center, means keying the transient support ring center to the journal so that the ring outer periphery rotates therewith, latch means adapted to lock the outer periphery of the transient support ring to the rolling element bearing outer race so that the rolling element bearing supports radial loads during startup, initial acceleration, deceleration and shut down, and to unlock and disengage at operating speeds, and a hydrostatic bearing in the form of a fluid lubricated bearing adapted to carry the radial loads at said operating speeds during the disengagement of the latch means and the rolling element bearing outer race.

2. The hybrid bearing of claim 1 wherein the latch means includes a plurality of fingers integral with the periphery of the transient support ring but perpendicular thereto and adapted to grasp the outer rolling element bearing, the fingers being releasable by centrifugal force.

3. The hybrid bearing of claim 2 wherein the transient support ring is in the form of a disk having a rim on its periphery, wherein the rim has a thickened outer edge, wherein the rim is provided with a plurality of spaced cuts forming the fingers therebetween, and wherein the rolling element bearing outer race is provided with indentations accepting the fingers.

4. The hybrid bearing of claim 3 wherein a transient support retainer is keyed to the Journal adjacent the transient support ring to rotate therewith to support the fingers and restrain their centrifugally forced outward movement.

5. The hybrid bearing of claim 4 wherein the rolling element bearing is a ball bearing, and wherein the transient support retainer is in the form of a disk with a rim at its periphery adjacent the transient support ring fingers.

* * * * *